Dec. 4, 1956     K. W. BINDING     2,772,825
AUTOMOBILE TOP CARRIER FOR LUGGAGE
Filed Sept. 23, 1953

Inventor
Kenneth W. Binding
by Roberts, Cushman & Grooves
Att'ys.

United States Patent Office 2,772,825
Patented Dec. 4, 1956

2,772,825

AUTOMOBILE TOP CARRIER FOR LUGGAGE

Kenneth W. Binding, Medford, Mass., assignor to Leo M. Beckwith, Brookline, Mass.

Application September 23, 1953, Serial No. 381,784

2 Claims. (Cl. 224—42.1)

This invention relates to automobile top carriers and especially to improvements for carriers of the kind disclosed in my pending application, Serial No. 342,925, filed March 17, 1953, and now abandoned.

The carrier illustrated in the aforementioned application comprises spaced, parallel rigid carrier bars arranged transversely of the automobile top which have at their ends legs which terminate in splayed feet for engagement with the top of the automobile for holding the carrier bars spaced from and parallel to the top, and flexible straps at their ends for securing the carrier bars to the automobile top. The carrier bars have distributed longitudinally thereof regularly spaced apertures for reception of attaching straps or the like. The principal object of this invention is to provide in combination with carriers of the foregoing kind certain adjunctive parts for adapting the carrier to mounting articles of luggage thereon without need for straps, belts, or similar means for lashing the luggage in place. Other objects are to provide parts which may easily and quickly be attached and removed, which when attached will provide very rigid support against lateral pressure exerted by the luggage, which will be of inexpensive construction and of attractive appearance.

As herein illustrated the adjunctive elements comprise a pair of rigid transversely spaced longitudinal rails mounted at opposite sides of the automobile on the opposite ends of the carrier bars, longitudinally spaced transverse rails extending between the longitudinal rails with their ends fastened thereto and a plurality of longitudinally extending transversely spaced slats subtending the carrier bars and made fast at their ends to the carrier bars. The longitudinal and transverse rails are vertically spaced from and substantially parallel to the plne of the carrier bars and fastening means cooperable with the slots in the carrier bars are employed for fastening them thereto. Similar fastening means are employed to secure the ends of the slats to the carrier bars. The rails are preferably made of springy, steel rods, and have at their forwarded and rear ends semi-circular portions which extends beyond the carrier bars. The extremities of the bent ends return to a spacing corresponding to that of the carrier bars and are attached thereto. The transverse rails are located substantially vertically above the crossbars.

The invention now will be described in greater details with reference to the accompanied drawings wherein.

Figure 1:
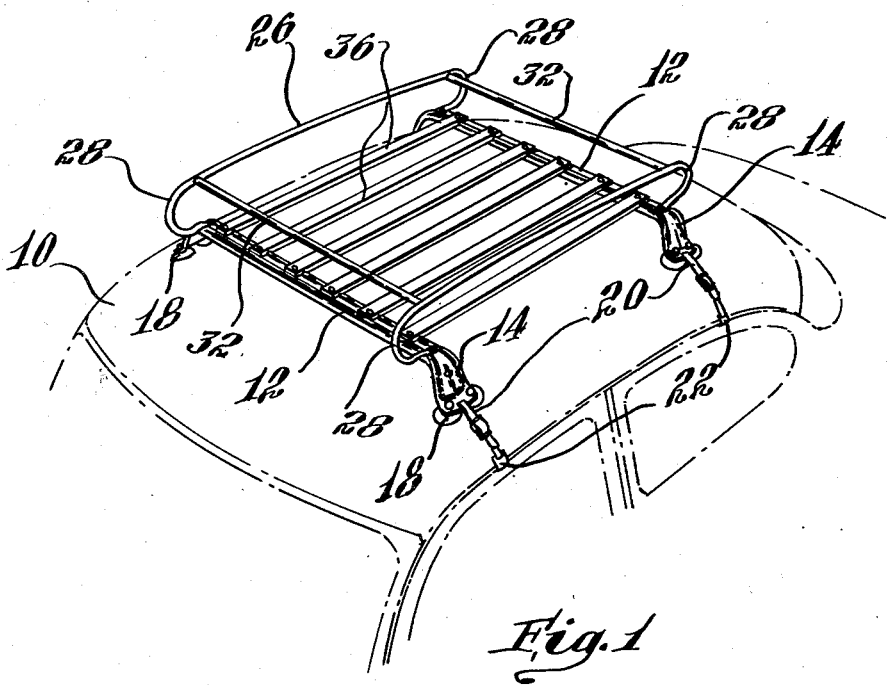
Fig. 1 is an isometric view of the top of an automobile showing the carrier fastened thereto and the adjunctive parts mounted thereon.
Figure 2:
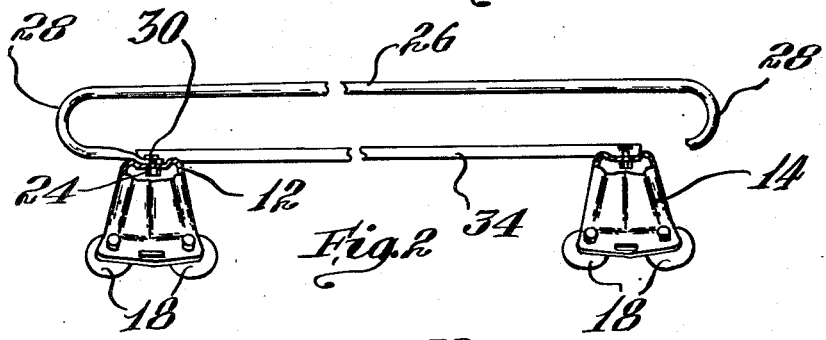
Fig. 2 is a side elevation of the carrier.
Figure 3:
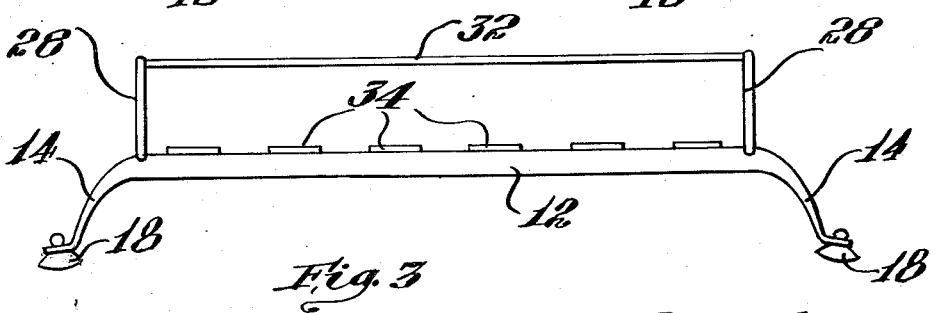
Fig. 3 is an end elevation of the carrier.

Referring to Fig. 1 there is shown the tonneau of an automobile having a top 10 on which are mounted in spaced parallel relation carrier bars 12 of the kind described in the above identified application, each of which comprises a rigid supporting member having at its opposite ends legs 14, terminating in feet 16, adapted to engage the top of the automobile to hold the carrier bar space from and parallel thereto. Rubber vacuum cups 18 are attached to the feet for cushioning the contact of the feet with the top. Flexible straps 20 passed through suitable apertures in the feet and having hooks 22 associated therewith provide for securing the carrier bars at their opposite ends to the gutters at opposite sides of the top. The supporting portions of the carrier bars are provided with regularly spaced apertures or keyholes 24 for reception of keys attached to the ends of straps or ropes with which articles resting on the carrier bars may be lashed in place.

The use of ropes and/or straps for attaching articles of luggage to the automobile top is generally recognized and acceptable for camping and cross country jaunts. However, for more gentile type of travel, fastidious persons prefer not to employ such means and the purpose of this invention is to provide adjunctive means for use with the carrier bars of the foregoing kind which will afford a more attractive appearance and yet will provide adequate support for luggage placed on the carrier bars without need for straps, ropes and other means for lashing it in place.

As herein illustrated a pair of rails 26 are mounted at the opposite sides of the automobile top on the opposite ends of the carrier bars 12 with their ends fastened thereto. The rails 26 are comprised of round bar-steel of somewhat springy character and are bent near their opposite ends to provide substantially semi-circular end portions 28 which extend beyond the carrier bars. The extremities of the bent ends terminate substantially diametrically opposite the origin of the curved portions and are spaced therefrom approximately twice the radius of curvature of the ends and from each other a distance corresponding to the spacing of the carrier bars. Fastening means in the form of bolts 30 are placed through holes in the extremities of the rails and through apertures 24 in the carrier bars for securing them in place. Transverse rails 32 are placed between the longitudinal rails and fastened at their ends to the longitudinal rails so as to be substantially vertically above the carrier bars and in the plane of the longitudinal rails. A plurality of longitudinally extending wooden slats 34 are mounted between the carrier bars and are spaced transversely to form a bottom on which luggage may be placed. The ends of these slats are fastened by bolts or screws to the carrier bars by engagement with the apertures 24 therein.

The rails may be chrome or nickel plated to provide attractive appearance and the wood slats may be finished in natural color so that the composite carrier affords a very attractive accessory for an automobile which will not be objectionable to even the most fastidious.

It should be understood that the present disclosure is for the purpose of illustration only and that this invention includes all modifications and equivalents which fall within the scope of the appended claims.

I claim:

1. For attachment to a pair of article carrier bars for automobile tops which bars when mounted on an automobile top are in spaced parallel relation and extend transversely of the top, the bars having bridge portions intermediate their ends vertically spaced above the top and provided with a plurality of apertures spaced lengthwise thereof, a luggage carrier attachment comprising a pair of transversely spaced longitudinal guard rails extending substantially parallel to the sides of the automobile and the ends of which extend over and adjacent the ends of the bridge portions of the bars and have apertures in registry with certain of the apertures in said bridge portions, longitudinally spaced transverse rails attached at their ends to the guard rails near the opposite ends of said guard rails, a plurality of longitudinally extending transversely spaced slats spanning the space between the bars and having apertures at their ends in registry with certain other of the apertures in said bridge portions of the bars, and fastening elements extending through the registered apertures of the guard rails and bridge portions of the bars and through the registered apertures of the slats and bridge portions of the bars, respectively, for detachably fastening the guard rails and slats to the bars.

2. For attachment to a pair of article carrier bars for automobile tops which bars when mounted on an automobile top are in spaced parallel relation and extend transversely of the top, the bars having bridge portions intermediate their ends vertically spaced above the top and provided with a plurality of apertures spaced lengthwise thereof, a luggage carrier attachment comprising a pair of transversely spaced longitudinal guard rails extending substantially parallel to the sides of the automobile and vertically spaced above the plane of the bridge portions of the bars and having downwardly and inwardly curved end portions the extremities of which terminate over and adjacent the ends of the bridge portions of the bars and have apertures in registry with certain of the apertures in said bridge portions, longitudinally spaced transverse rails attached at their ends to the guard rails near the ends of and substantially in the plane of said guard rails, a plurality of longitudinally extending transversely spaced slats spanning the space between the bars and having apertures at their ends in registry with certain other of the apertures in said bridge portions of the bars, and fastening elements extending through the registered apertures of the guard rails and bridge portions of the bars and through the registered apertures of the slats and bridge portions of the bars, respectively, for detachably fastening the guard rails and slats to the bars.

References Cited in the file of this patent
UNITED STATES PATENTS

| | | |
|---|---|---|
| D. 172,817 | Binding | Aug. 17, 1954 |
| 2,596,860 | McCrory et al. | May 13, 1952 |
| 2,639,848 | Burmeister | May 26, 1953 |
| 2,643,040 | Hare | June 23, 1953 |